(12) United States Patent
Zhang

(10) Patent No.: US 9,565,102 B2
(45) Date of Patent: Feb. 7, 2017

(54) METHOD AND APPARATUS FOR DETERMINING ENERGY EFFICIENT ROUTE

(71) Applicant: HUAWEI TECHNOLOGIES CO., LTD., Shenzhen (CN)

(72) Inventor: Mingui Zhang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 82 days.

(21) Appl. No.: 14/645,505

(22) Filed: Mar. 12, 2015

(65) Prior Publication Data

US 2015/0222537 A1 Aug. 6, 2015

Related U.S. Application Data

(63) Continuation of application No. PCT/CN2013/083427, filed on Sep. 12, 2013.

(30) Foreign Application Priority Data

Sep. 14, 2012 (CN) .......................... 2012 1 0341473

(51) Int. Cl.
*H04L 12/751* (2013.01)
*H04L 12/721* (2013.01)
*H04L 12/911* (2013.01)

(52) U.S. Cl.
CPC ............ *H04L 45/70* (2013.01); *H04L 45/02* (2013.01); *H04L 45/124* (2013.01); *H04L 47/829* (2013.01); *Y02B 60/42* (2013.01)

(58) Field of Classification Search
None
See application file for complete search history.

(56) References Cited

U.S. PATENT DOCUMENTS 5,734,586 A * 3/1998 Chiang ................ H02J 3/16
307/31
6,011,804 A * 1/2000 Bertin ................ H04L 12/5602
370/230

(Continued)

FOREIGN PATENT DOCUMENTS

CN 101449525 6/2009
CN 101834758 9/2010

(Continued)

OTHER PUBLICATIONS

International Search Report mailed Dec. 12, 2013 in corresponding international application PCT/CN2013/083427.

(Continued)

*Primary Examiner* — Steven H Nguyen
(74) *Attorney, Agent, or Firm* — Staas & Halsey LLP

(57) ABSTRACT

This application provide a method for determining an energy-efficient route, and relate to the communications field. The method includes: acquiring a topology structure, a starting node, a target node, and traffic data of a network, where the traffic data includes a record of traffic among all nodes on the network; and calculating, according to the topology structure and the traffic data of the network by using an integer linear programming algorithm, an energy-efficient route between the starting node and the target node and reserved bandwidth corresponding to the energy-efficient route.

10 Claims, 2 Drawing Sheets

(56) References Cited

U.S. PATENT DOCUMENTS

| | | | | |
|---|---|---|---|---|
| 6,304,349 | B1* | 10/2001 | Alanyali | H04J 14/0227 398/9 |
| 6,538,991 | B1* | 3/2003 | Kodialam | H04L 12/5695 370/229 |
| 6,584,071 | B1* | 6/2003 | Kodialam | H04L 45/02 370/238 |
| 6,976,087 | B1* | 12/2005 | Westfall | H04L 12/5695 370/238 |
| 7,298,704 | B2* | 11/2007 | Kodialam | H04L 45/62 370/238 |
| 7,889,641 | B2* | 2/2011 | Liu | H04L 12/5695 370/228 |
| 2004/0153492 | A1* | 8/2004 | Cao | H04J 14/0212 709/200 |
| 2005/0069314 | A1* | 3/2005 | De Patre | H04J 14/0227 398/5 |
| 2008/0019266 | A1 | 1/2008 | Liu et al. | |
| 2008/0232274 | A1* | 9/2008 | Grover | H04L 41/024 370/255 |
| 2009/0034457 | A1* | 2/2009 | Bahl | H04W 16/10 370/329 |
| 2009/0185542 | A1 | 7/2009 | Zhang et al. | |
| 2012/0230184 | A1 | 9/2012 | Yong et al. | |
| 2013/0003605 | A1* | 1/2013 | Peterson | H04L 41/145 370/255 |
| 2014/0099119 | A1* | 4/2014 | Wei | H04J 14/0257 398/79 |

FOREIGN PATENT DOCUMENTS

| | | | |
|---|---|---|---|
| CN | 101841482 | 9/2010 | |
| CN | 102523170 | 6/2012 | |
| EP | 1035751 A2 * | 9/2000 | H04L 45/04 |
| EP | 2 466 833 A1 | 6/2012 | |
| WO | WO 2007/016118 A1 | 2/2007 | |
| WO | WO 2009/017602 A1 | 2/2009 | |

OTHER PUBLICATIONS

M. Zhang et al., "Green TE: Power-Aware Traffic Engineering," *2010 18th IEEE International Conference on Network Protocols (ICNP )*, Oct. 2010, pp. 21-30.

Extended European Search Report mailed May 15, 2015 for corresponding European Patent Application No. 13837511.8.

International Search Report mailed Dec. 12, 2013 for corresponding International Patent Application No. PCT/CN2013/083427.

* cited by examiner

METHOD AND APPARATUS FOR DETERMINING ENERGY EFFICIENT ROUTE

CROSS-REFERENCE TO RELATED APPLICATIONS

This application is a continuation of International Application No. PCT/CN2013/083427, filed on Sep. 12, 2013, which claims priority to Chinese Patent Application No. 201210341473.9, filed on Sep. 14, 2012, both of which are hereby incorporated by reference in their entireties.

TECHNICAL FIELD

The present invention relates to the communications field, and in particular, to a method and an apparatus for determining an energy-efficient route.

BACKGROUND

A large amount of electric energy is required during Internet running. In 2007, electric energy consumed by the Internet accounts for 5.3% of electric energy consumed globally in that year, and in the same year, total electric energy consumed by the Internet in America accounts for 9.4% of total electric energy consumed in America. However, among the consumed electric energy, a large amount of electric energy is wasted. With continuous expansion of a network size and a rapid growth of service volumes, a requirement of a network on electric energy and consumption of electric energy by the network increase constantly, which imposes great pressure on running costs of a network and an ecological environment. Therefore, a network energy-efficient technology attracts increasingly more attention.

Deployment of redundant links and bandwidth has greatly improved reliability of a network. However, experience shows that an average link bandwidth occupation rate of a backbone network is less than 40%. In addition, a link has to keep enabled even if a bandwidth occupation rate is extremely low, which means that a large amount of electric energy is wasted.

In a method for determining a route in the prior art, there are problems of a poor energy-efficient effect and long energy-efficient route calculation time.

SUMMARY

In view of this, this application provide a method and an apparatus for determining an energy-efficient route, which can be used to determine an energy-efficient route between a starting node and a target node on a network.

According to one aspect, this application provides a method for determining an energy-efficient route, including: acquiring a topology structure, a starting node, a target node, and traffic data of a network, where the traffic data includes a record of traffic among all nodes on the network; and calculating, according to the topology structure and the traffic data of the network by using an integer linear programming algorithm, an energy-efficient route between the starting node and the target node and reserved bandwidth corresponding to the energy-efficient route, where a target function of the integer linear programming algorithm maximizes the number of idle links on the network, and a constraint condition of the integer linear programming algorithm includes a traffic constraint condition, where the traffic constraint condition uses a value of traffic, which flows through any link, between the starting node and the target node.

According to another aspect, this application provides an apparatus for determining an energy-efficient route, including: a network data acquiring unit, configured to acquire a topology structure, a starting node, and traffic data of a network, where the traffic data includes a record of traffic among all nodes on the network; and an energy-efficient route calculating unit, configured to calculate, according to the topology structure and the traffic data of the network by using an integer linear programming algorithm, an energy-efficient route between the starting node and a target node and reserved bandwidth corresponding to the energy-efficient route, where a target function of the integer linear programming algorithm maximizes the number of idle links on the network, and a constraint condition of the integer linear programming algorithm includes a traffic constraint condition, where the traffic constraint condition uses a value of traffic, which flows through any link, between the starting node and the target node.

By using the technical solutions of this application, it is ensured as much as possible that the number of idle links on a network is maximized. By means of collaboration among routers, an energy-efficient route aggregates network traffic onto some links on the network for transmission, so that some links on the network do not carry traffic, and these links may be disabled or be set in a dormant state, so as to reduce energy consumption.

DESCRIPTION OF EMBODIMENTS

To make the objectives, technical solutions, and advantages of the embodiments clearer and more comprehensible, the following describes the embodiments in further detail with reference to the accompanying drawings and embodiments. It should be understood that specific embodiments described herein are merely used to explain the embodiments but are not intended to limit the present invention. Specific implementation manners of the embodiments include a method and an apparatus for determining an energy-efficient route. The method included in the implementation manners of the embodiments may be implemented by using a hardware device, such as a general-purpose computer or a network server.

Figure 1:
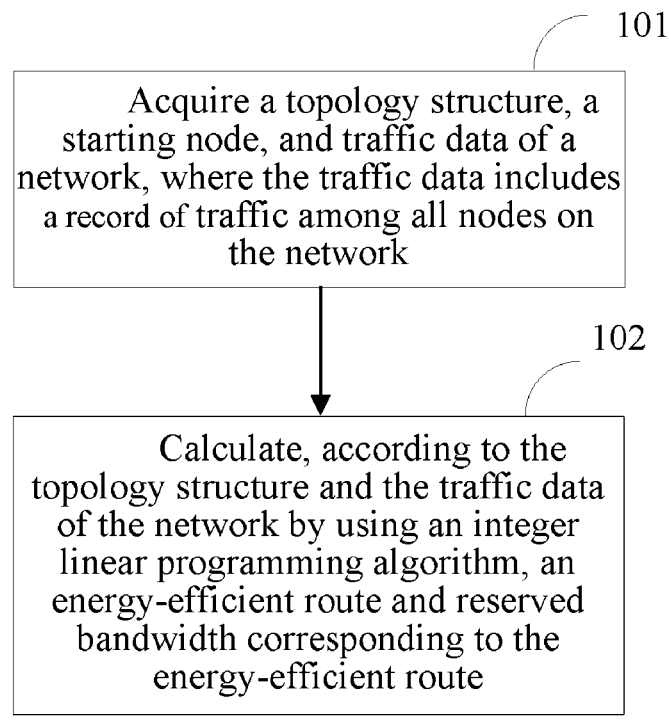
FIG. 1 is a flowchart corresponding to a method for determining an energy-efficient route according to an embodiment.

According to an embodiment, as shown in FIG. 1, a method for determining an energy-efficient route includes the following steps:

101. Acquire a topology structure, a starting node, and traffic data of a network, where the traffic data includes a record of traffic among all nodes on the network.

For example, the foregoing topology structure of the network includes at least: bandwidth of a link on the network, a connection relationship of the nodes on the network, and network performance parameter of a link, where the network performance parameter may be specifically a parameter, such as a delay, a packet loss rate, or a delay variation of the link, or may be a comprehensive performance parameter obtained by means of a specific algorithm by using the foregoing multiple single performance parameters as input. For example, a smaller network performance parameter value of the energy-efficient route indicates better performance, that is, indicates a better route. It should be noted that, how to determine an advantage of a route is based on a selected parameter and a specific algorithm corresponding to the parameter, and the foregoing definition is only a possible manner for determining an advantage of a route. In the embodiment, the Open Shortest Path First (Open Shortest Path First, OPSF) protocol is used as an example to measure network performance of each link on the network.

Figure 2:
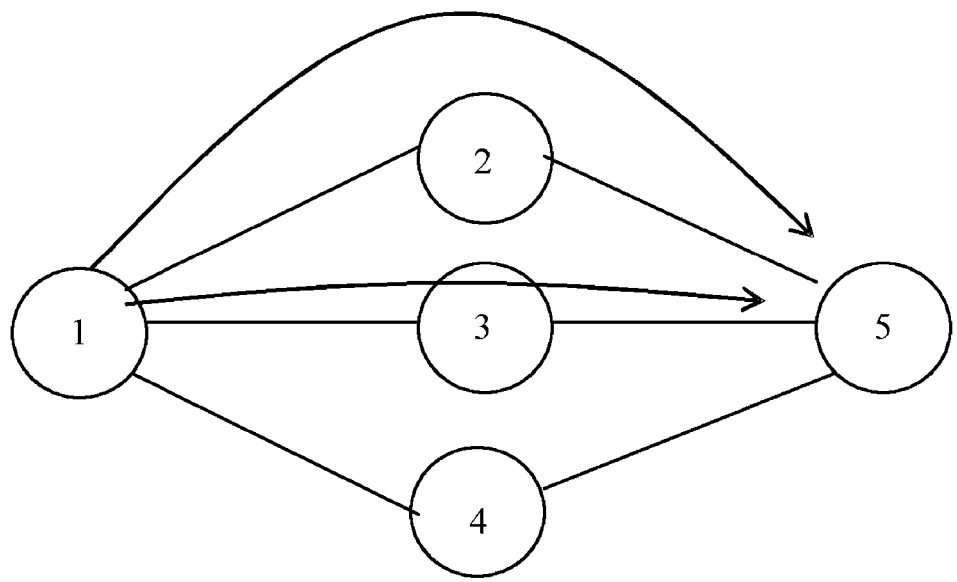
FIG. 2 is a schematic diagram of a network topology determined by a method and an apparatus for determining an energy-efficient route according to an embodiment.

An application scenario of the embodiments is shown in FIG. 2, on the network, there are five nodes (Node) 1, 2, 3, 4, and 5, and 12 links 1-2, 2-1, 2-5, 5-2, 1-3, 3-1, 3-5, 5-3, 1-4, 4-1, 4-5, and 5-4 (because a link is bidirectional), and bandwidth of each link is 1 Gbps. The node 1 and the node 5, for example, may be provider edge devices PE (Provider Edge), and the node 2, the node 3, and the node 4, for example, may be provider routers P (Provider Router). The node 1 is connected to the node 5 by using the node 2, the node 3, and the node 4.

In the embodiment, a traffic matrix may be used to represent traffic among nodes. A corresponding traffic matrix is shown in Table 1, and a unit of the traffic among the nodes is Gbps. This table indicates that there is 1 Gpbs of constant traffic from the Node1 to the Node5, that is, $D_{1,5}=1$. Traffic among other nodes is 0, for example, $D_{1,2}=0$.

TABLE 1

|  | Node1 | Node2 | Node3 | Node4 | Node5 |
| --- | --- | --- | --- | --- | --- |
| Node1 | 0 | 0 | 0 | 0 | 1 |
| Node2 | 0 | 0 | 0 | 0 | 0 |
| Node3 | 0 | 0 | 0 | 0 | 0 |
| Node4 | 0 | 0 | 0 | 0 | 0 |
| Node5 | 0 | 0 | 0 | 0 | 0 |

102. Calculate, according to the topology structure and the traffic data of the network by using an integer linear programming algorithm, an energy-efficient route and reserved bandwidth corresponding to the energy-efficient route.

$$\text{Maximize} \sum_{l \in E} P_l x_l; \quad (1)$$

$$\text{s.t.} \sum_{l \in E} f_l^{s,t} O_l^i - \sum_{l \in E} f_l^{s,t} I_l^i = \begin{cases} D_{s,t}, & i = s \\ -D_{s,t}, & i = t \\ 0, & i \neq s, t \end{cases} \quad (2)$$

$$s, t, i \in V, s \neq t;$$

$$u_l = \frac{1}{C_l} \sum_{s,t \in V, s \neq t} f_l^{s,t}, l \in E \quad (3)$$

$$x_l = x_{r(l)}, l \in E$$
$$x_l + u_l \leq 1, l \in E$$
$$u_l \leq U_T.$$

In linear programming, a linear programming problem in which all unknown quantities are required to be integers is called an integer programming (integer programming, IP) or integer linear programming (integer linear programming, ILP) problem. In the embodiment, that integer linear programming is used as an optimization model is used as an example to describe a method for determining an optimal route in the embodiment; and an algorithm for determining the optimal route includes formulas (1), (2), and (3).

In the embodiment, a traffic constraint condition in the optimization model is an essential condition, which is represented by the formula (3) in the embodiment. In the embodiment, a variable f in the traffic constraint condition is used for determining the energy-efficient route. In a traffic constraint condition represented by the formula (3), $u_l$ represents a utilization rate of a link l, $C_l$ represents a capacity of the link l, and $x_l$ an integer variable. $x_l$ is 1 when the link l is in an idle state (that is, when the link l is disabled), and when the link l is enabled, $x_l$ is 0. All variables in the constraint condition may take any value in value ranges of the variables, for example, $u_l$ is any real number in [0,1]. $x_l$ is an integer variable, a value of which is 0 or 1.

In the formula (2), a parameter $I_l^i$ represents whether the link l is an incoming link of a node i, and a parameter $O_l^i$ represents whether the link l is an outgoing link of the node i. A parameter $D_t^s$ represents communication traffic from the starting node s to the target node t. $f_l^{s,t}$ is a variable that needs to be solved in the optimization model and represents a value of traffic from the starting node s to the target node t that flows through the link l. According to a value of f, a route from the starting node s to the target node t is determined, and bandwidth reserved for the traffic from the starting node s to the target node t on each link l is determined. A value of $f_l^{s,t}$ is any real number in [0, $D_{s,t}$]. All possible values of the variables form solution space of the optimization model. In the optimization model, constant attempts are made in the solution space, and a value of a target function represented by the formula (1) is recorded during each attempt, where a definition of $x_l$ is the same as that of $x_l$ in the constraint condition. $x_l$ is 1 when the link l is in an idle state (that is, when the link l is disabled), and $x_l$ is 0 when the link l is enabled. Pl represents power consumption of the link l. Among all these attempts, values of all variables corresponding to an attempt that maximizes the target function are an optimal solution of the optimization model, that is, values of variables that can achieve a best energy-efficient effect. In the embodiment, searching space is a set that includes k (k is a natural number that is greater than or equal to 1) routes between each pair of nodes. According to the foregoing example, the searching space limits the value of $f_l^{s,t}$. If the link l is not on k routes from the starting node s to the target node t, the value of $f_l^{s,t}$ is definitely 0. This type of limitation reduces invalid attempts in an optimization process, and increases a solving speed of optimization.

For a network topology shown in FIG. 2, it is assumed that a value of a constraint condition UT is 0.5, which indicates that link utilization rates of all links cannot be greater than 50%. It is assumed that a value of Pl is 10 watts (W), which indicates that power consumption of each link is 10 W. There are 12 links in the foregoing network topology, and total energy consumption is 120 W when all the 12 links are enabled.

In the embodiment, an attempt range may be decreased by using an optimization tool. An attempt during which an optimal solution obviously cannot be obtained is reduced, so as to increase a solving speed. For example, the solving speed may be optimized by using a simplex algorithm. The optimization tool is not limited in the embodiment.

To obtain a better optimization effect and reduce optimization calculation time, in the embodiment, when route searching space is determined before the energy-efficient route is calculated, a route with a best energy-efficient effect is included in the route searching space preferentially. Generally, the energy-efficient effect is measured by using total energy consumption of all links used by this route. Smaller total energy consumption indicates a better energy-efficient effect. When energy-efficient effects of multiple routes are evaluated, total energy consumption of all links used by the multiple routes are used for measurement, and smaller total energy consumption indicates better energy-efficient effects of the multiple routes. Not only k shortest paths is used as the route searching space.

For example, in the embodiment, when the route searching space is determined before the energy-efficient route is calculated, energy-efficient effects of the energy-efficient routes are sorted, and then a route with a best energy-efficient effect is included in the route searching space preferentially. If there are less than k routes in the route searching space at this time, k shortest paths that are not included in the routes with a best energy-efficient effect are added into the route searching space, so that there are k routes in the route searching space.

In the embodiment, a result of calculating an energy-efficient route of the network topology shown in FIG. 2 by using the formulas (1), (2), and (3) is as follows.

This figure indicates that two routes, "125" and "135", are used, and 0.5 Gbps of traffic is allocated to each route, which meets a constraint condition that a link utilization rate is not greater than 50%. There are three variables $f_l^{s,t}$, $x_l$ and $u_l$ in the model.

A value of $f_l^{s,t}$ is as follows.

All values of $f_l^{s,t}$ in which s is not 1 or t is not 5 are 0.

For $f_l^{s,t}$ in which s=1 and t=5, when values corresponding to 1 are a link 1-2, a link 2-5, a link 1-3, and a link 3-5, values of $f_l^{s,t}$ are all 0.5, and otherwise, the values of $f_l^{s,t}$ are 0.

A value of $x_l$ is as follows (it can be calculated that a value of a target function is 40 W):

When the values corresponding to 1 are a link 1-4, a link 4-1, a link 4-5, and a link 5-4, the value of $x_l$ is 1.

When the values corresponding to 1 are other links, the value of $x_l$ is 0.

A value of $u_l$ is as follows.

When the values corresponding to 1 are a link 1-2, a link 2-5, a link 1-3, and a link 3-5, values of $u_l$ are all 0.5.

When the values corresponding to 1 are other links, the value of $u_l$ is 0.

In the embodiment, when the foregoing algorithm is used to determine the energy-efficient route, searching space is a set that includes k (k is a natural number greater than or equal to 1) routes between each pair of nodes. According to the foregoing example, the searching space limits the value of $f_l^{s,t}$. If the link l is not on k routes from the starting node s to the target node t, the value of $f_l^{s,t}$ is definitely 0. This type of limitation reduces invalid attempts in an optimization process, and increases a solving speed of optimization. Preferably, in the embodiment, optimized searching space may further be used to determine the energy-efficient route. For example, after the energy-efficient route is determined, all possible routes between each pair of nodes are sorted in ascending order according to energy consumption. First k routes are selected from the foregoing sorted routes. If there are less than k routes, all the possible routes are used as the searching space. By calculating the energy-efficient route by using the optimized searching space, a better energy-efficient effect can be obtained and calculation time can be reduced.

Figure 3:
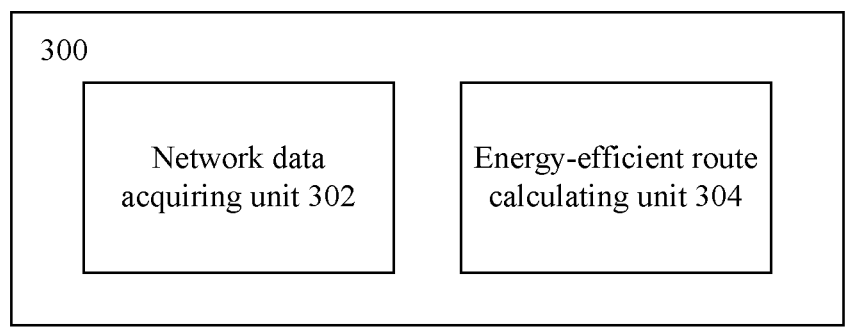
FIG. 3 is a schematic diagram of an apparatus for determining an energy-efficient route according to an embodiment.

According to another embodiment, as shown in FIG. 3, an embodiment further provides an apparatus 300 for determining an energy-efficient route, where the apparatus 300 includes:

a network data acquiring unit 302, configured to acquire a topology structure, a starting node, and traffic data of a network, where the traffic data includes a record of traffic among all nodes on the network; and an energy-efficient route calculating unit 304, configured to calculate, according to the topology structure and the traffic data of the network by using an integer linear programming algorithm, an energy-efficient route and reserved bandwidth corresponding to the energy-efficient route.

Preferably, the energy-efficient route calculating unit 304 may further includes an energy-efficient route calculating subunit 3040 and a searching space determining unit 3042. The searching space determining unit 3042 is configured to sort energy-efficient effects of energy-efficient routes, and preferentially include a route with a best energy-efficient effect in route searching space instead of only using k-shortest path (k shortest paths) as the route searching space. Therefore, a better optimization effect can be obtained and optimization calculation time can be reduced.

The apparatus for determining an energy-efficient route provided in the embodiment corresponds to the method for determining an energy-efficient route provided in the embodiment. Details are not described herein again.

According to the method and the apparatus for determining an energy-efficient route provided in the embodiments, a better optimization effect can be obtained and optimization calculation time can be reduced.

According to the foregoing descriptions of the embodiments, a person skilled in the art may clearly understand that the embodiments may be implemented by software in addition to a necessary general hardware platform or may be implemented by hardware. Based on such an understanding, the technical solutions of the embodiments may be implemented in a form of a software product. The software product is stored in a storage medium, such as a ROM/RAM, a hard disk, or an optical disc, and includes several instructions for instructing a computer device (which may be a personal computer, a server, or another network device) to perform the methods described in the embodiments or some of the embodiments.

The foregoing descriptions are merely exemplary embodiments, but are not intended to limit the protection scope of the present invention. Any modification, equivalent replacement, or improvement made without departing from the spirit and principle of the present invention shall fall within the protection scope of the present invention.

What is claimed is:

1. A method for determining an energy-efficient route, comprising:

acquiring a topology structure, a starting node, a target node, and traffic data among all nodes of a network; and determining, according to the topology structure and the traffic data of the network by using an integer linear programming algorithm, an energy-efficient route between the starting node and the target node; and determining, according to the topology structure and the traffic data of the network by using the integer linear programming algorithm, reserved bandwidth corresponding to the energy-efficient route, wherein a target function of the integer linear programming algorithm maximizes the number of idle links on the network, and a constraint condition of the integer linear programming algorithm comprises a traffic constraint condition,
wherein the traffic constraint condition is represented by the following formula:

$$u_l = \frac{1}{C_l} \sum_{s,t \in V, s \neq t} f_l^{s,t}, l \in E$$

$$x_l = x_{r(l)}, l \in E$$

$$x_l + u_l \leq 1, l \in E$$

$$u_l \leq U_T$$

wherein, $u_l$ represents a utilization rate of the link l, $C_l$ represents a capacity of the link l, and $x_l$ is 1 when the link l is in an idle state, and otherwise, $x_l$ is 0.

2. The method according to claim 1, wherein the topology structure of the network comprises at least:
bandwidth of a link on the network, a weight value of a link on the network, and a connection relationship of the nodes on the network.

3. The method according to claim 1, wherein the integer linear programming algorithm is represented by the following formula:

$$\text{s.t.} \sum_{l \in E} f_l^{s,t} O_l^i - \sum_{l \in E} f_l^{s,t} I_l^i = \begin{cases} D_{s,t}, i = s \\ -D_{s,t}, i = t \\ 0, i \neq s, t \end{cases}$$

$$s, t, i \in V, s \neq t$$

wherein, a parameter E represents a link set of the network, and a parameter V represents a node set of the network;
a parameter $I_l^i$ represents whether a link l is an incoming link of a node i, and a parameter $O_l^i$ represents whether the link l is an outgoing link of the node i;
a parameter $D_{s,t}$ represents traffic from the starting node s to the target node t in the traffic data; and
$f_l^{s,t}$ is a variable that needs to be solved and represents a value of traffic from the starting node s to the target node t that flows through the link l, wherein the energy-efficient route is determined according to a value of f.

4. The method according to claim 1, wherein a route corresponding to values, which meet a target function $$\text{Maximize} \sum_{l \in E} P_l x_l,$$

of $f_l^{s,t}$ and $x_l$ is the determined energy-efficient route, wherein $P_l$ represents power consumption of the link l.

5. The method according to claim 1, further comprising:
when route searching space is determined before the energy-efficient route is determined, sorting energy-efficient effects of energy-efficient routes, the energy-efficient routes comprising a route having a greatest energy-efficient effect in the route searching space.

6. An apparatus for determining an energy-efficient route, comprising:
at least one processor; and
at least one memory which stores a plurality of instructions, which when executed by the at least one processor, cause the at least one processor to execute:
acquiring a topology structure, a starting node, a target node, and traffic data among all nodes of a network;
determining, according to the topology structure and the traffic data of the network by using an integer linear programming algorithm, an energy-efficient route between the starting node and the target node; and
determining, according to the topology structure and the traffic data of the network by using the integer linear programming algorithm, reserved bandwidth corresponding to the energy-efficient route,
wherein a target function of the integer linear programming algorithm maximizes the number of idle links on the network, and a constraint condition of the integer linear programming algorithm comprises a traffic constraint condition,
wherein the traffic constraint condition is represented by the following formula:

$$u_l = \frac{1}{C_l} \sum_{s,t \in V, s \neq t} f_l^{s,t}, l \in E$$

$$x_l = x_{r(l)}, l \in E$$

$$x_l + u_l \leq 1, l \in E$$

$$u_l \leq U_T$$

wherein, $u_l$ represents a utilization rate of the link l, $C_l$ represents a capacity of the link l, and $x_l$ is 1 when the link l is in an idle state, and otherwise, $x_l$ is 0.

7. The apparatus according to claim 6, wherein the topology structure of the network comprises at least:
bandwidth of a link on the network, a weight value of a link on the network, and a connection relationship of the nodes on the network.

8. The apparatus according to claim 6, wherein the integer linear programming algorithm is represented by the following formula:

$$\text{s.t.} \sum_{l \in E} f_l^{s,t} O_l^i - \sum_{l \in E} f_l^{s,t} I_l^i = \begin{cases} D_{s,t}, i = s \\ -D_{s,t}, i = t \\ 0, i \neq s, t \end{cases}$$

$$s, t, i \in V, s \neq t$$

wherein, a parameter E represents a link set of the network, and a parameter V represents a node set of the network;
a parameter $I_l^i$ represents whether a link l is an incoming link of a node i, and a parameter $O_l^i$ represents whether the link l is an outgoing link of the node i;
a parameter $D_{s,t}$ represents traffic from the starting node s to the target node t in the traffic data; and
$f_l^{s,t}$ is a variable that needs to be solved and represents a value of traffic from the starting node s to the target node t that flows through the link l, wherein the energy-efficient route is determined according to a value of f.

9. The apparatus according to claim 6, a route corresponding to values, which meet a target function $$\text{Maximize} \sum_{l \in E} P_l x_l,$$

of $f_l^{s,t}$ and $x_l$ is the determined energy-efficient route, wherein $P_l$ represents power consumption of the link l.

10. The apparatus according to claim 6, further comprising sorting energy-efficient effects of energy-efficient routes, and the energy-efficient routes comprising a route having a greatest energy-efficient effect in route searching space.

* * * * *